Patented May 21, 1929.

1,713,590

UNITED STATES PATENT OFFICE.

ROBERT BERLINER, BERTHOLD STEIN, AND WILLY TRAUTNER, OF ELBERFELD, GERMANY, ASSIGNORS TO GRASSELLI DYESTUFF CORPORATION, OF NEW YORK, N. Y., A CORPORATION OF DELAWARE.

CINNAMYLIDENE ANTHRONES.

No Drawing. Application filed September 16, 1926; Serial No. 135,984, and in Germany October 8, 19..

Our invention provides for the production of novel condensation products of anthrones with alpha-beta unsaturated aromatic aldehydes.

We have found that whereas anthrone and cinnamic aldehydes do not condense in alkaline solution, they readily react in a neutral or in an acid medium to form compounds which have most probably the formula:

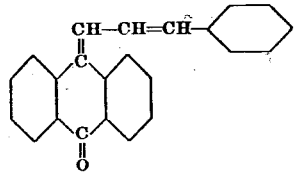

and which are accordingly called cinnamylidene anthrones.

The reaction proceeds with about monomolecular proportions of the components and is substantially quantitative. Our preferred process is to achieve the condensation in somewhat diluted sulfuric acid at ordinary or only moderately elevated temperatures. A sulfate of the cinnamylidene anthrones is obtained primarily which is easily decomposed by water, but other acidic condensing agents, such as phosphorous-oxychloride can be used with the same result, or acidic condensing agents can be entirely dispensed with; the condensation proceeds even in neutral medium by merely allowing the unsaturated aldehyde to react upon the anthrone.

Substituted cinnamic aldehydes as well as their derivatives react in the same manner with anthrones.

Instead of anthrone itself substituted anthrones react also with cinnamic aldehyde compounds to produce the corresponding cinnamylidene derivatives, as such substituted anthrones we might mention alpha- and beta-hydroxy-anthrones, alpha- and beta-chloro-anthrones, anthrone-beta-carboxylic acid, alkyl and aryl-anthrones, etc.

The novel cinnamylidene-anthrones are usually yellow colored substances, which are soluble in the usual organic solvents. They are soluble in concentrated sulfuric acid with blue colors, which solutions contain most likely a sulfate, the color of such solutions changes gradually due to sulfonation. Oxydation, for instance the action of chromic acid in glacial acetic solution, yields anthraquinones and benzoic acid, or the corresponding substitution products, when starting from substituted cinnamylidene-anthrones.

Our novel products have been found very useful as intermediate compounds for the production of dyestuffs.

The following examples will further illustrate our invention.

*Example 1.*—19 parts anthrone are dissolved in 200 parts concentrated sulfuric acid. To this solution, a solution of 13 parts cinnamic aldehyde in 200 parts 65% sulfuric acid, is gradually added at 40–50° C. whilst stirring. The reaction mass becomes quickly of a dark blue color and solidifies in a few minutes to a crystalline magma of blue needles. The mass is filtered off on vacuum, the precipitate washed with a little 70% sulfuric acid and decomposed with water. After filtering again yellow crystals are obtained, which are dried in the air. The product crystallizes from acetone in beautiful yellow needles melting at 110° C. It dissolves in concentrated sulfuric acid with a deep corn-flower blue color, which in a few minutes turns bluish-red and after prolonged standing shows a green fluorescence. The so obtained cinnamylidene-anthrone has most probably the formula:

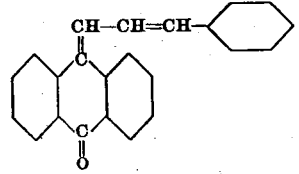

*Example 2.*—43 parts 1-2-benzo-anthraquinone (naphthanthraquinone) are dissolved in 500 parts concentrated sulfuric acid heated to 35–40° C. 10 parts aluminum powder are now gradually added with good stirring. The dark colored melt becomes lighter after three to four hours stirring, the reduction is finished and the solution contains now the 1-2-benzo-anthrone. It is cooled to 10–20° C. and a solution of 22 parts cinnamic aldehyde in 500 parts 60% sulfuric acid, cooled to 10° C. added whilst stirring. The reaction mass turns blue and the condensation product separates. The thick magna is stirred into ice water, and the dark colored sulfate decomposes to a yellow product, which is the cinnamylidene-1-2-benzo-anthrone. It dissolves in concentrated sulfuric acid with a reddish-blue color, which changes quickly into a bluish-red. Crystallization from acetone yields it in beautiful yellow crystals. It corresponds probably to one of the isomeric formulas:

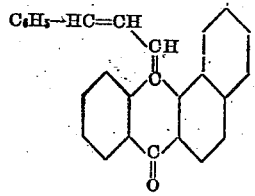

or

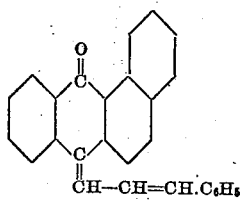

We claim:

1. In processes of producing cinnamylidene-anthrones the step consisting in condensing cinnamic aldehyde compounds with anthrone compounds in a nonalkaline medium at a temperature of from about 30° C. to about 50° C.

2. In processes of producing cinnamylidene-anthrones the step consisting in condensing cinnamic aldehyde compounds with anthrone compounds in presence of an acidic condensing agent at a temperature of from about 30° C. to about 50° C.

3. In processes of producing cinnamylidene-anthrones the step consisting in reacting with a cinnamic aldehyde compound upon an anthrone compound in solution of sulfuric acid at a temperature of from about 30° C. to about 50° C.

4. In processes of producing cinnamylidene-anthrone the step consisting in reacting with cinnamic aldehyde upon anthrone at temperatures of about 40–45° C. and in solution of sulfuric acid of a concentration between 60% and 96%.

5. As new products cinnamylidene-anthrone compounds of the most probable formula:

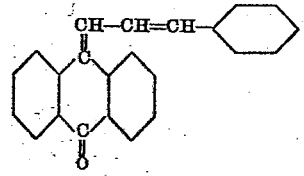

in which both the anthrone and the benzene can be substituted, which are yellow colored crystalline substances, soluble in the usual organic solvents, soluble in concentrated sulfuric acid with blue colors, which change on standing and which are substantially identical with the product obtained by condensing a cinnamic aldehyde compound with an anthrone compound in a nonalkaline medium.

6. As a new product cinnamylidene-anthrone of the most probable formula:

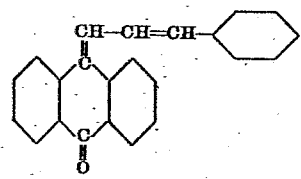

which is a yellow colored crystalline substance melting after crystallization from acetone at 110° C., soluble in concentrated sulfuric acid with a corn-flower blue color, which turns bluish-red and after some standing shows a green fluorescence.

In testimony whereof, we affix our signatures.

ROBERT BERLINER.
BERTHOLD STEIN.
WILLY TRAUTNER.